(12) United States Patent
Han et al.

(10) Patent No.: US 11,714,294 B2
(45) Date of Patent: Aug. 1, 2023

(54) CAMERA MODULE

(71) Applicant: Namuga, Co., Ltd., Seongnam-si (KR)

(72) Inventors: Jin Suk Han, Incheon (KR); Tae Hoon Jung, Suwon-si (KR); Seung Taek Shin, Ansan-si (KR)

(73) Assignee: NAMUGA, CO., LTD., Seongnam-si (KR)

(*) Notice: Subject to any disclaimer, the term of this patent is extended or adjusted under 35 U.S.C. 154(b) by 197 days.

(21) Appl. No.: 17/210,942

(22) Filed: Mar. 24, 2021

(65) Prior Publication Data

US 2022/0082848 A1  Mar. 17, 2022

(30) Foreign Application Priority Data

Sep. 11, 2020  (KR) .................. 10-2020-0116747

(51) Int. Cl.
*G02B 27/64* (2006.01)
*G02B 7/09* (2021.01)
*G03B 5/02* (2021.01)
*H04N 23/55* (2023.01)
*H04N 23/68* (2023.01)

(52) U.S. Cl.
CPC ............. *G02B 27/646* (2013.01); *G02B 7/09* (2013.01); *G03B 5/02* (2013.01); *H04N 23/55* (2023.01); *H04N 23/687* (2023.01)

(58) Field of Classification Search
USPC ....................................... 396/55; 348/208.99
See application file for complete search history.

(56) References Cited

U.S. PATENT DOCUMENTS 8,861,946 B2 * 10/2014 Kim ..................... G02B 27/646
396/55
2015/0378169 A1 * 12/2015 Kim ....................... G03B 13/36
359/557

FOREIGN PATENT DOCUMENTS

| KR | 20070065195 | 6/2007 |
| KR | 20110097122 | 8/2011 |
| KR | 20150059997 | 6/2015 |
| KR | 20170045978 A | * 10/2015 |

* cited by examiner

*Primary Examiner* — Clayton E. LaBalle
*Assistant Examiner* — Warren K Fenwick
(74) *Attorney, Agent, or Firm* — Korus Patent, LLC; Seong Il Jeong

(57) ABSTRACT

Provided is a camera module which includes a cover, a base connected with the cover, and a lens carrier provided between the cover and the base, the camera module including: an OIS body provided inside the cover; a first ball bearing interposed between the cover and the OIS body; an AF driver provided between the OIS body and the lens carrier; and an OIS driver for moving the OIS body in perpendicular to an optical axis of the lens carrier. Since the first ball bearing is supported while being in direct contact with an inner ceiling of the cover and an upper surface of the OIS body, the overall module thickness may be formed to be thinner than a structure in which the ball bearing is provided below the OIS body.

16 Claims, 6 Drawing Sheets

CAMERA MODULE

BACKGROUND OF THE INVENTION

Field of the Invention

The present invention relates to a small camera module, and more particularly, to a camera module capable of forming a more compact structure for auto focusing and image stabilization functions than that of the related art.

Description of the Related Art

A camera module having an auto focusing (AF) function that automatically adjusts the focus of a lens when photographing a subject has been widely applied to mobile devices such as mobile phones and tablet PCs as well as general digital cameras.

In recent years, the camera module is not limited to the auto focusing (AF) function and adopts an image stabilization function. The image stabilization scheme may be classified into an electronic scheme and an optical scheme. An electronic image stabilizer (EIS) is a method that corrects and processes an image signal output from an image sensor with a program. On the other hand, an optical image stabilizer (OIS) is a method of mechanically adjusting the position or angle of an image sensor or a lens optical system.

Since a camera module equipped with an OIS device is complicated in structure and large in volume, there are a lot of difficulties in adopting the camera module for the mobile devices. For example, in Korean Patent Publication No. 10-2007-0065195, there is disclosed a device for image bias correction, but the device may not be structurally applied to mobile devices such as a smart phone.

However, as the OIS device can be miniaturized, a small camera module which includes the OIS function was developed like Korean Patent Publication No. 10-2011-0097122. However, four magnets are mounted on four surfaces of the camera module for the AF and OIS functions.

Even in Korean Patent Publication No. 10-2015-0059997 (published on Jun. 3, 2015), there is disclosed an optical adjusting apparatus. The optical adjusting apparatus is characterized in that a base, an OIS driver, an AF driver, and a lens barrel are sequentially mounted, a plurality of ball bearings are provided between the base and the OIS driver, and a plurality of ball bearings are also provided between the OIS driver and the AF driver. However, it is very difficult to reduce the thickness because many electrical connection devices and drivers are provided between the base and the OIS driver in the optical adjusting apparatus.

In particular, in the optical adjusting apparatus, it is very difficult to form a camera module in a compact shape by forming a base and an OIS extension unit extending vertically from the base in the OIS driver.

The above-described technical configuration is the background art for assisting the understanding of the present invention, and does not mean a conventional technology widely known in the art to which the present invention belongs.

SUMMARY OF THE INVENTION

The present invention has been made in an effort to provide a camera module capable of forming a compact size and a slim thickness while implementing both auto focusing and image stabilization functions.

The present invention has been also made in an effort to provide a camera module capable of simplifying an assembly sequence and minimizing interference between drivers by configuring a driver in combination of a coil and a magnet.

According to an aspect of the present invention, there is provided a camera module which includes a cover, a base connected with the cover, and a lens carrier provided between the cover and the base, the camera module including: an OIS body provided inside the cover; a first ball bearing interposed between the cover and the OIS body; an AF driver provided between the OIS body and the lens carrier; and an OIS driver for moving the OIS body in perpendicular to an optical axis of the lens carrier. Since the first ball bearing is supported while being indirect contact with an inner ceiling of the cover and an upper surface of the OIS body, the overall module thickness may be formed to be thinner than a structure in which the ball bearing is provided below the OIS body.

A pocket portion for accommodating the first ball bearing may be formed on the inner ceiling of the cover, and the upper surface of the OIS body corresponding to the pocket portion may be provided as a flat surface. When the camera module has a quadrangular plane, the pocket portions and the first ball bearings may be provided at four edges, and spaces at the four edges may be efficiently used in correspondence with a central circular lens carrier.

The OIS body may have a tendency to be in close contact with the inner ceiling of the cover. This may use a combination of a magnet and a yoke to be described below, but in addition to this, various methods using springs or the like may be used.

According to an embodiment of the present invention, the OIS driver may be provided between the cover and the OIS body. Specifically, the OIS driving unit may include a first magnet mounted on the upper surface of the OIS body, a first coil mounted on the inner ceiling of the cover in response to the first magnet, and a first yoke interposed between the first coil and the cover. Through this configuration, the first coil may move the OIS body in a direction perpendicular to the optical axis of the lens carrier in response to the first magnet, and the first yoke may serve to allow the OIS body to be in close contact with the cover in response to the first magnet.

Since a current or electrical signal is provided to the first coil, it may be advantageous to provide the first coil in a relatively fixed position. To this end, the OIS driver may include a first flexible printed circuit board (FPCB) provided between the first coil and the cover, wherein the first FPCB may be electrically connected with the first coil, a first end of the first FPCB may extend downward along the inner surface of the cover to be exposed around the base, and a first terminal may be formed at the first end of the first FPCB.

However, the positions of the first coil and the first magnet maybe applied in reverse. For example, the OIS driving unit may also include a first magnet mounted on the inner ceiling of the cover, a first coil mounted on the upper surface of the OIS body in response to the first magnet, and a first yoke interposed between the first coil and the OIS body.

The camera module may further include a second FPCB provided on the base and provided with a second end exposed to the periphery of the base, and a position detection sensor of the OIS body formed on the upper surface of the second FPCB, wherein a second terminal may be formed at the second end of the second FPCB. The first terminal of the first FPCB and the second terminal of the second FPCB described above are bound to different parts, respectively, but it may be preferable to be located adjacent to the base to facilitate connection with the outside.

The AF driver may include a second coil mounted on an inner surface of a central space of the OIS body, and a second magnet mounted on aside surface of the lens carrier in response to the second coil, and the central space of the OIS body may be formed within a thickness of the OIS body without vertical extension.

The camera module may further include a plurality of wire springs provided between the OIS body and the base to provide a horizontal restoring force of the OIS body, wherein these wire springs are physically separated, but act on one OIS body, so that the OIS body may move to its original position or provide a predetermined restoring force, and each wire spring may also function as a transmission means for transmitting a current or an electrical signal to the AF driver mounted on the moving OIS body. To this end, one end of each wire spring may be connected with a circuit of the AF driver, and the other end thereof may be exposed around the base to form a third terminal.

Specifically, the wire spring may include a first fixing piece fixed to a bottom surface of the OIS body in response to the one end, a first wave extending from the first fixing piece, a second fixing piece fixed to the base or the cover in response to the other end, and a second wave extending from the second fixing piece and intersecting with and connected with the first wave, and the third terminal may be formed to be bent from the second fixing piece.

The AF driver may further include a third FPCB constituting a part of the circuit of the AF driver and electrically connected with the second coil, and the wire spring may include a fourth terminal extending and bent from the first fixing piece and electrically connected with the third FPCB.

According to another aspect of the present invention, there is provided a camera module including: a base; a cover connected with the base; an OIS body provided inside the cover and the base; a lens carrier provided in a central space of the OIS body and moving in an optical axis direction; a first ball bearing interposed between an inner ceiling of the cover and an upper surface of the OIS body; an AF driver provided between the OIS body and the lens carrier; and an OIS driver for moving the OIS body in perpendicular to an optical axis of the lens carrier. The OIS driver may include a first magnet mounted on the upper surface of the OIS body, a first coil mounted on the inner ceiling of the cover in response to the first magnet, and a first yoke interposed between the first coil and the cover, wherein the first coil may move the OIS body in a direction perpendicular to the optical axis of the lens carrier in response to the first magnet, and the first yoke may allow the OIS body to be in close contact with the cover in response to the first magnet.

A pocket portion for accommodating the first ball bearing may be formed on the inner ceiling of the cover, and the upper surface of the OIS body corresponding to the pocket portion may be provided as a flat surface.

The OIS driver may include a first FPCB (FPCB) provided between the first coil and the cover, wherein the first FPCB is electrically connected with the first coil, a first end of the first FPCB extends downward along the inner surface of the cover to be exposed around the base, and a first terminal is formed at the first end of the first FPCB.

The camera module may further include a second FPCB provided on the base and provided with a second end exposed to the periphery of the base, and a hall sensor formed on the upper surface of the second FPCB, wherein a second terminal may be formed at the second end of the second FPCB, and the hall sensor may be located below the first magnet to detect the position of the OIS body by using the movement of the first magnet.

The AF driver may include a second coil mounted on an inner surface of the central space of the OIS body and a second magnet mounted on aside surface of the lens carrier in response to the second coil, wherein the central space of the OIS body is formed within a thickness of the OIS body without vertical extension.

According to the camera module of the present invention, it is possible to forma compact size and a slim thickness while implementing both auto focusing and image stabilization functions.

According to the camera module of the present invention, it is possible to simplify an assembly sequence and minimize interference between drivers by configuring a driver in combination of a coil and a magnet.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
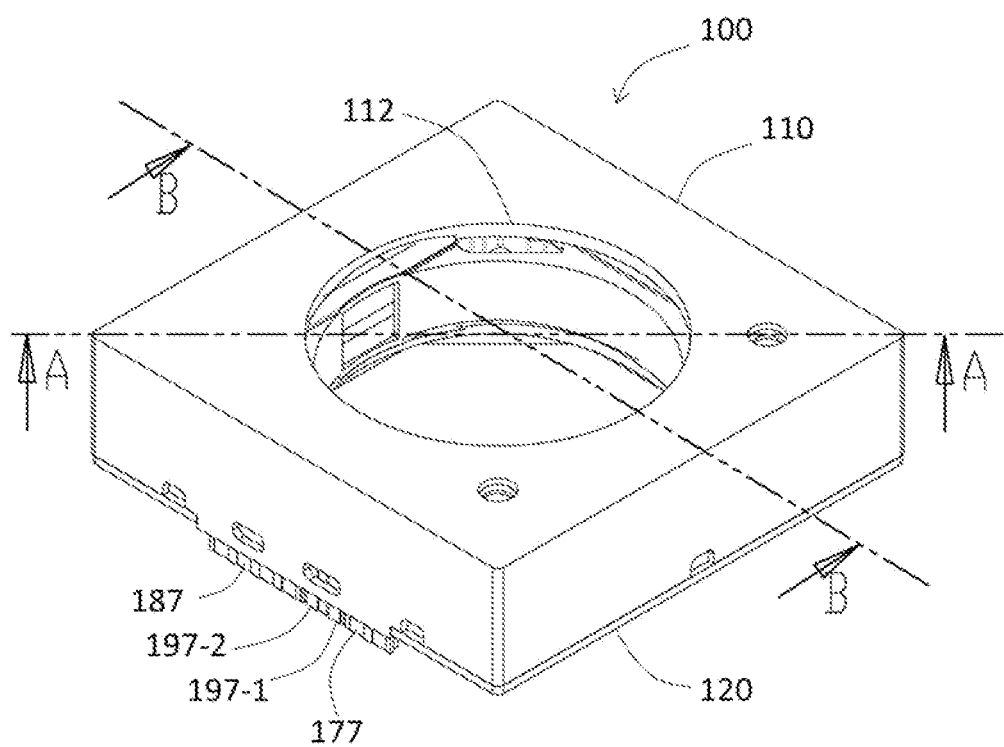
FIG. 1 is a diagram for describing a camera module according to an embodiment of the present invention.

Hereinafter, preferred embodiments of the present invention will be described in detail with reference to the accompanying drawings, but the present invention is not limited or restricted to the embodiments. For reference, in the description, like reference numerals substantially refer to like elements, which may be described by citing contents disclosed in other drawings under such a rule and contents determined to be apparent to those skilled in the art or repeated may be omitted.

Figure 2:
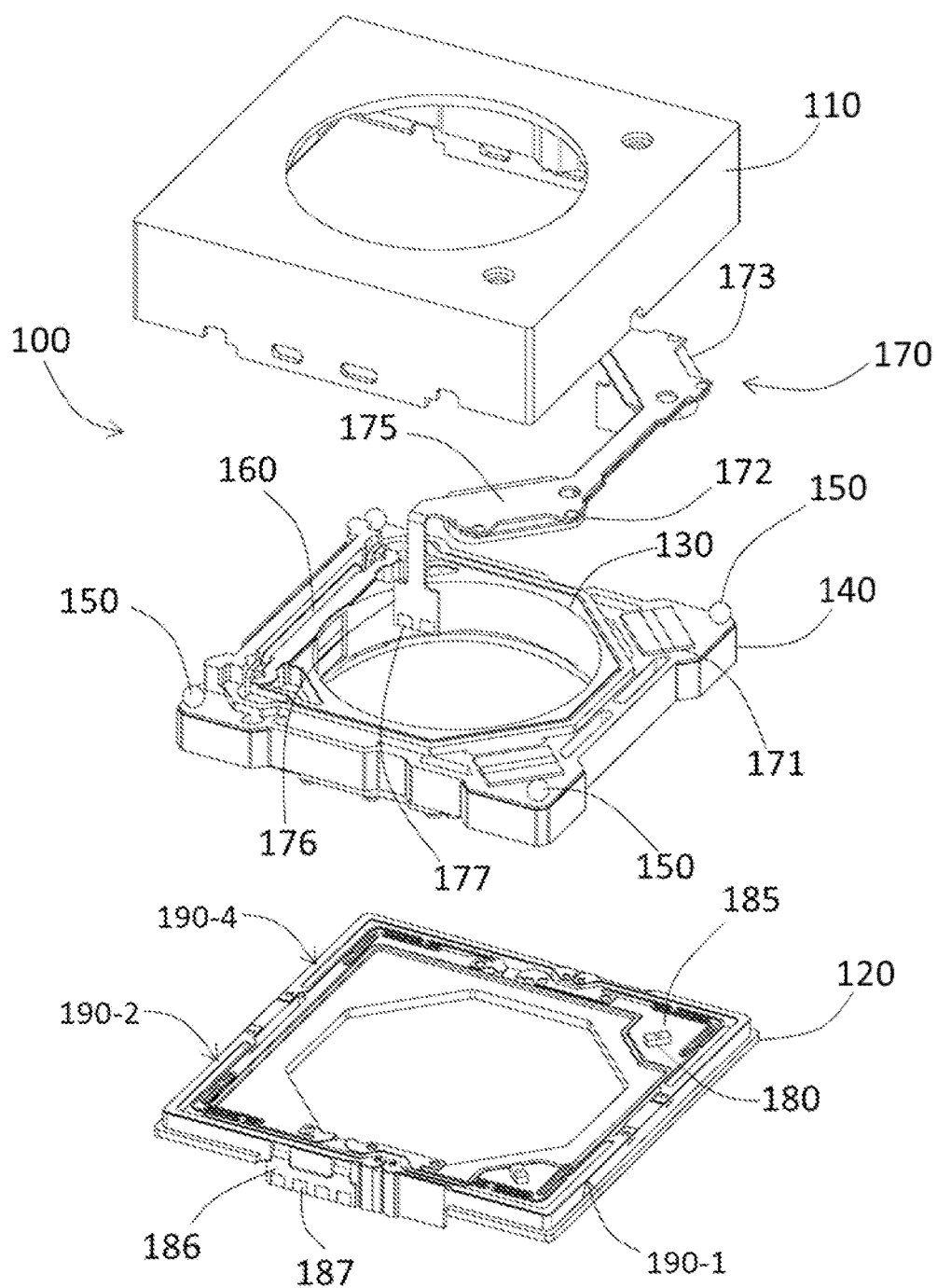
FIG. 2 is a diagram for describing an exploded structure of the camera module of FIG. 1.
Figure 3:
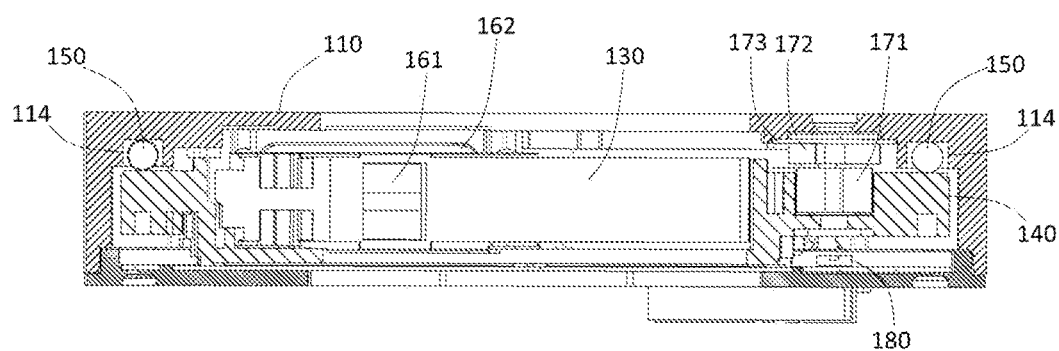
FIG. 3 is a diagram for describing a cross section A-A of the camera module of FIG. 1.
Figure 4:
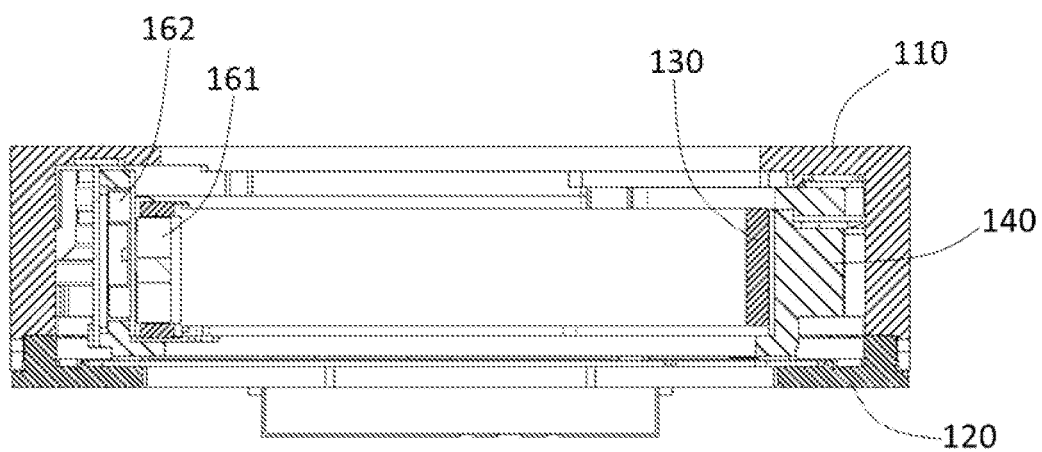
FIG. 4 is a diagram for describing a cross section B-B of the camera module of FIG. 1.
Figure 5:
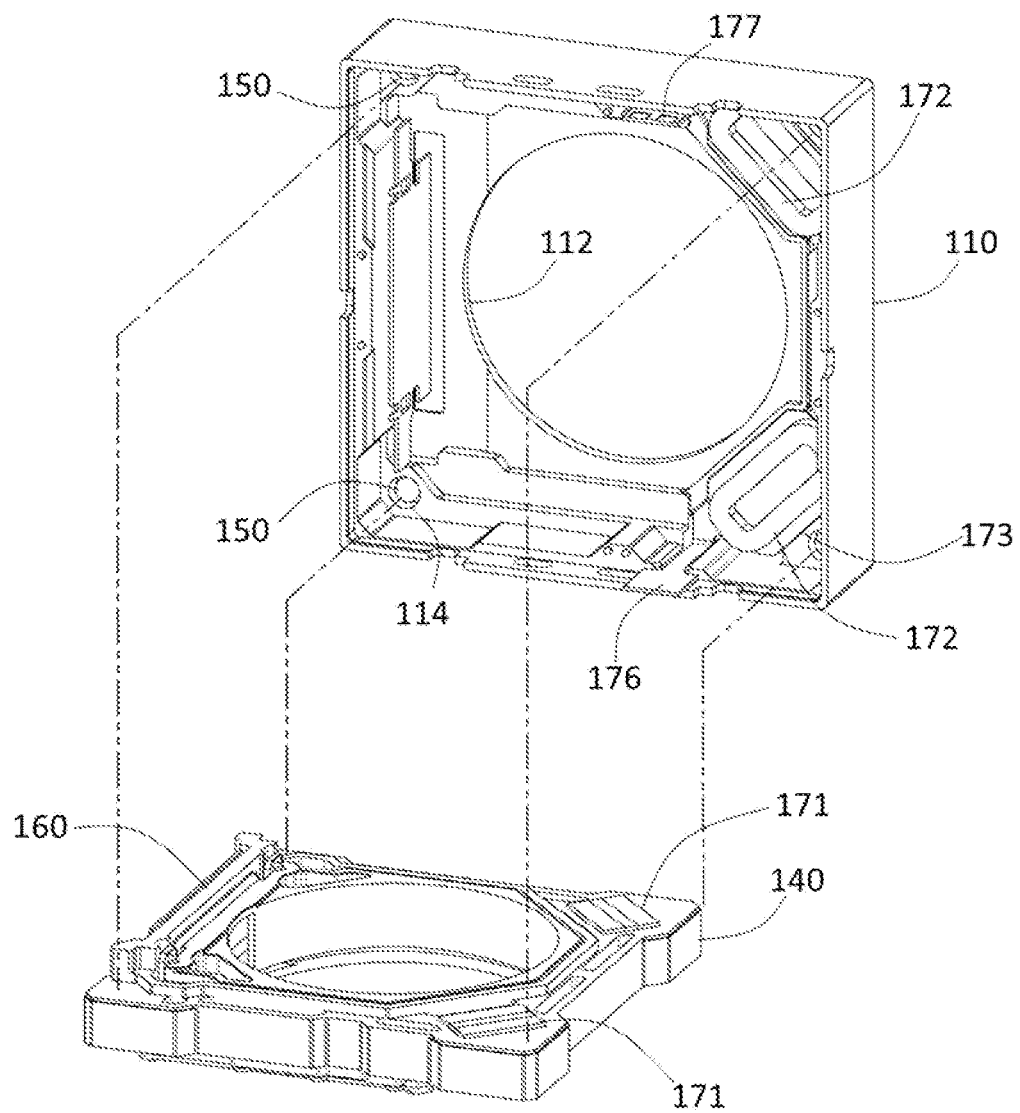
FIG. 5 is a diagram for describing a process of assembling an OIS body to a cover in the camera module of FIG. 1.
Figure 6:
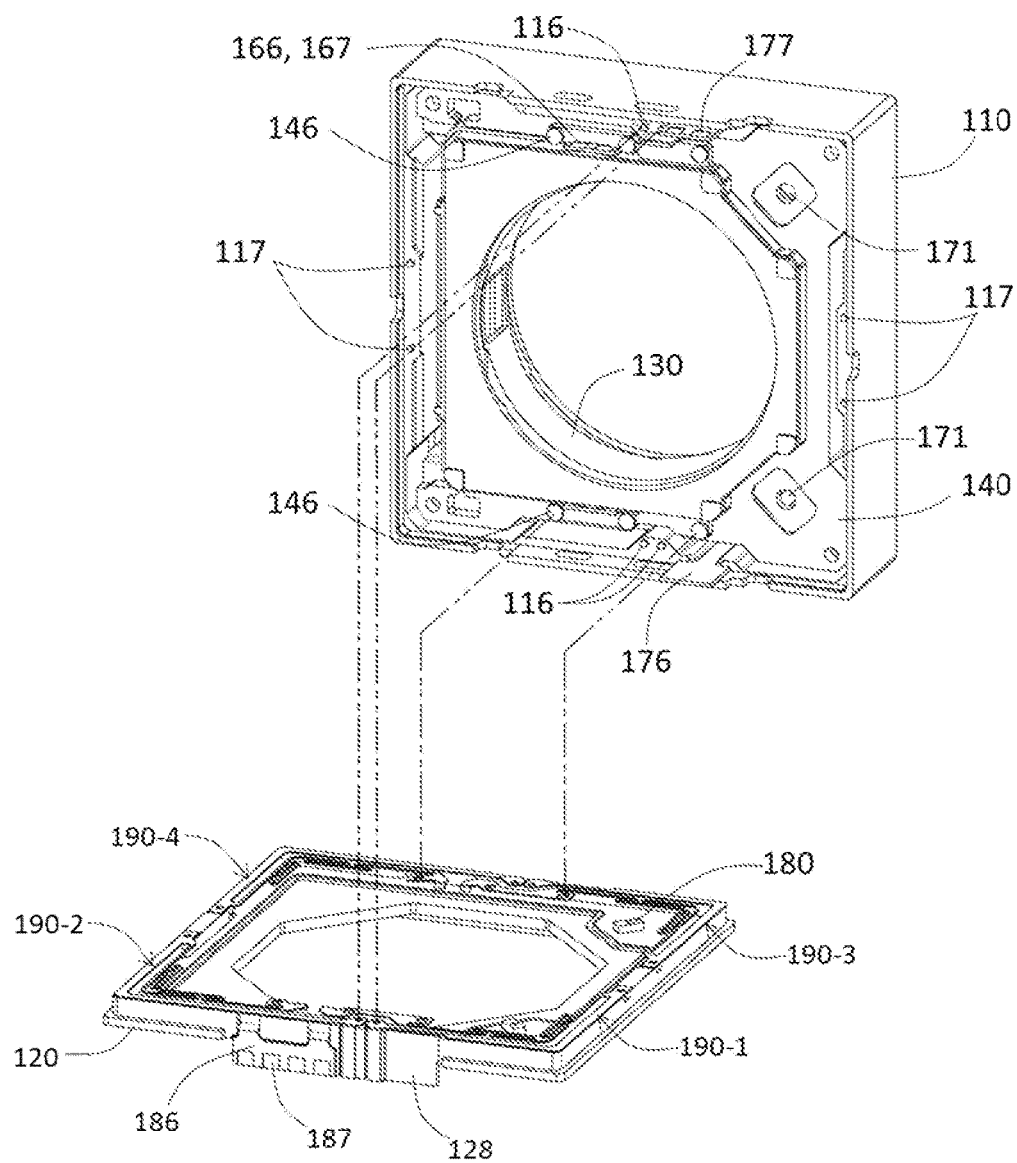
FIG. 6 is a diagram for describing a process of further assembling a base after assembling the OIS body to the cover in the camera module of FIG. 1.
Figure 7:
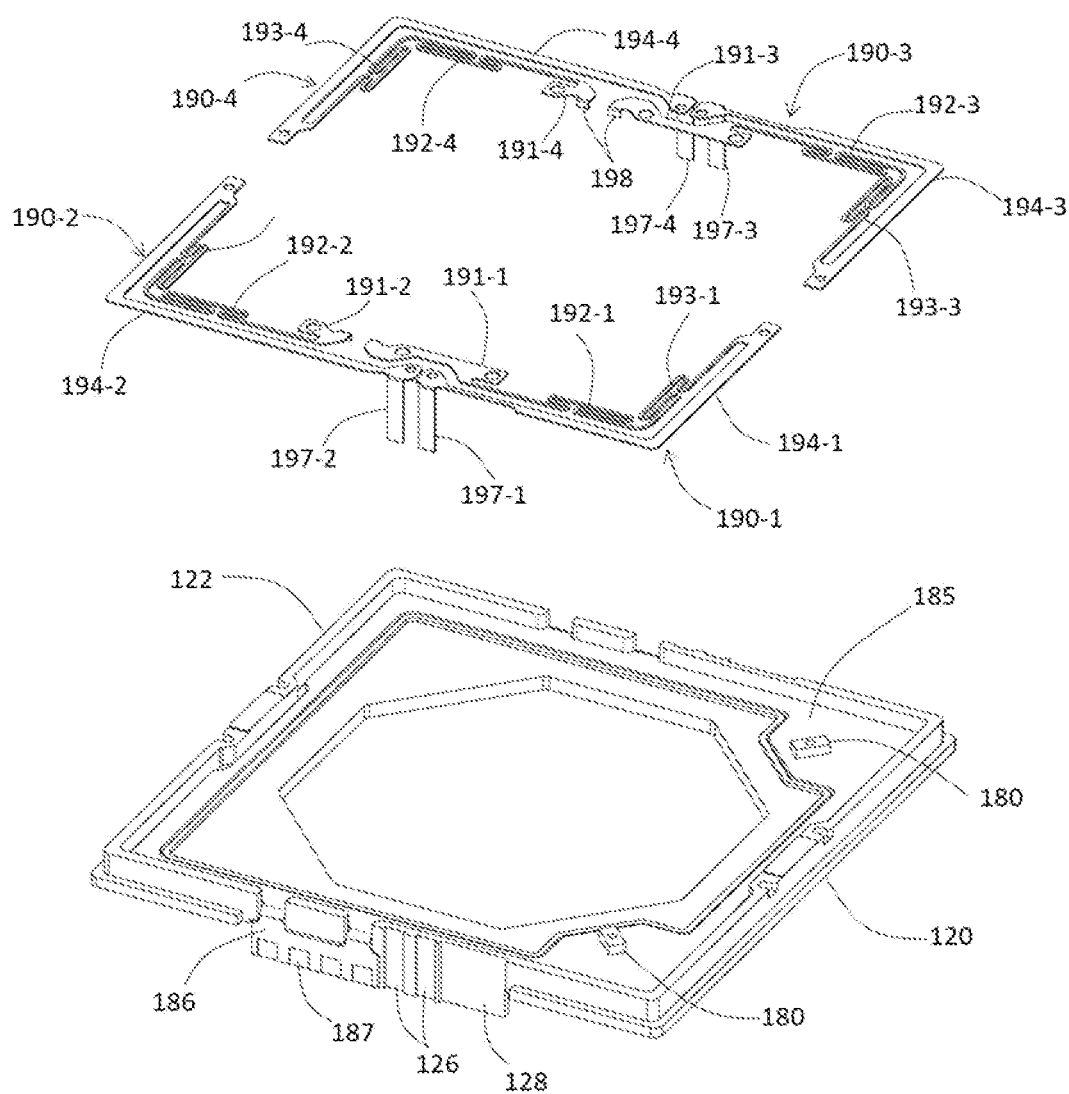
FIG. 7 is a diagram for specifically describing the base and a wire spring in the camera module of FIG. 1.

FIG. 1 is a diagram for describing a camera module according to an embodiment of the present invention, FIG. 2 is a diagram for describing an exploded structure of the camera module of FIG. 1, FIG. 3 is a diagram for describing a cross section A-A of the camera module of FIG. 1, FIG. 4 is a diagram for describing a cross section B-B of the camera module of FIG. 1, FIG. 5 is a diagram for describing a process of assembling an OIS body to a cover in the camera module of FIG. 1, FIG. 6 is a diagram for describing a process of further assembling a base after assembling the OIS body to the cover in the camera module of FIG. 1, and FIG. 7 is a diagram for specifically describing the base and a wire spring in the camera module of FIG. 1.

Referring to FIGS. 1 to 7, a camera module 100 may include a cover 110, a base 120 connected with the cover 110, a lens carrier 130 provided between the cover 110 and the base 120, a slim OIS body 140 provided inside the cover 110, four first ball bearings 150 interposed between the cover 110 and the slim OIS body 140, an AF driver 160 provided between the OIS body 140 and the lens carrier 130, and an OIS driver 170 for moving the OIS body 140 in perpendicular to an optical axis of the lens carrier 130

For reference, in the embodiment, the camera module 100 may be mounted on a conventional substrate (not illustrated) on which a conventional image sensor (not illustrated) is mounted, and may adjust an image formed on the image sensor by using a lens or lens group provided in the lens carrier 130. However, in another embodiment, the image sensor may be included together inside the camera module.

In addition, the 'optical axis' may be understood as a line corresponding to the center of the lens, and in the drawings, it may also be understood as a vertical line passing through the center of the cover 110 and the base 120. Therefore, the 'optical axis direction' maybe appreciated as a direction which coincides with the optical axis or is parallel or substantially horizontal to the optical axis. As a result, the 'horizontal direction' may be appreciated as a direction vertical to the optical axis or almost vertical to the optical axis. As one example, when a coordinate system constituting x, y, and z axes is assumed, if the z axis is the optical axis, a direction in which only (x, y) as well as x and y axes is expressed may be referred to as the horizontal direction.

As illustrated in the drawings, the camera module 100 according to the embodiment may be provided in an overall flat box shape, and the OIS body 140 accommodated therein is also provided in an overall flat quadrangular box shape and provided with a central space at the center thereof. A lens, a lens group, a filter, etc. may be further provided in a cylindrical space of the lens carrier 130.

The four first ball bearings 150 maybe provided at edges of an upper surface of the OIS body 140, respectively, and may be in direct contact with an inner ceiling of the cover 110 and an upper surface of the OIS body 140. This structure may be advantageous in forming the overall module thickness to be thinner than the structure in which the ball bearings are provided below the OIS body.

As illustrated in FIG. 3, a central hole 112 is formed in the center of the ceiling of the cover 110, and four pocket portions 114 for receiving the first ball bearings 150 may be provided inside the central hole 112, that is, in the inner ceiling of the cover 110. In addition, the upper surface of the OIS body 140 corresponding to the pocket portions 114 may be provided as a flat surface. Since the camera module 100 is entirely formed in a quadrangular shape, the pocket portions 114 and the first ball bearings 150 may be provided at four edges on the OIS body 140, and may efficiently use the spaces of the four edges in response to the periphery of the lens carrier 130 in the center.

In addition, as illustrated in FIG. 5, the first ball bearings 150 are positioned in the pocket portions 114 of the cover 110, and the OIS body 140 and the lens carrier 130 pulled by a magnetic force may be mounted with a simple operation to easily assemble the ball bearings. Such an advantage may further reduce the use of lubricants and the like, thereby solving a difficulty of control due to contamination or damping of the module, changes in movement characteristics due to changes in physical properties, and the like.

In the embodiment, the OIS driver 170 may be provided between the cover 110 and the OIS body 140. Specifically, the OIS driver 170 may include two sets of first magnets 171 embedded in two corners of the upper surface of the OIS body 140, two first coils 172 mounted on the inner ceiling of the cover 110 in response to the first magnets 171, a first yoke 173 interposed between the first coil 172 and the cover 110, and a first flexible printed circuit board (FPCB) 175 electrically connected with the two first coils 172 at the rear side of the first yoke 173.

The first coil 172 may move the OIS body 140 in a direction perpendicular to the optical axis (z axis) of the lens carrier 130, that is, in a horizontal direction of x and y axes in response to the first magnet 171, and the first yoke 173 located at the rear side of the first coil 172 may function to closely contact the OIS body 140 to the cover 110 by using an attractive force with the first magnet 171. In another related art, the magnet for closely contacting the OIS body and the base may be provided separately from the magnet of the OIS driver, but in this structure, the OIS function and the close contact function may be simultaneously implemented by using one first magnet 171.

The first FPCB 175 is in close contact with the inner ceiling of the cover 110 and is electrically connected with the first coil 172 to transmit an electrical signal for OIS control.

To this end, a first end 176 of the first FPCB 175 may extend to both sides thereof and extend downward along the inner surface of the cover 110, and may be intensively formed at the periphery of the base 120, preferably, at a position where a first terminal 177, a second terminal 187, and a third terminal 197 are exposed adjacent to each other. In addition, the first terminal 177 for connection with the outside may be formed at the first end 176 of the first FPCB 175.

Unlike the embodiment, in another embodiment, the positions of the first coil and the first magnet may also be applied in reverse. For example, the OIS driver may also include a first magnet mounted on the inner ceiling of the cover, a first coil mounted on the upper surface of the OIS body in response to the first magnet, and a first yoke interposed between the first coil and the OIS body.

Referring to FIGS. 2 and 7, a second FPCB 185 for controlling a hall sensor 180 and the like may be provided on the base 120. The second FPCB 185 may provide a second end 186 extending downward around the base 120, and the second end 186 maybe provided with a second terminal 187 for transmitting and receiving an electrical signal to and from the hall sensor 180.

Hall sensors 180 may be provided on the upper surface of the second FPCB 185 in response to the first magnet 171 of the OIS body 140, respectively. The hall sensors 180 may detect the movement of the first magnet 171 fixed to the OIS body 140 to provide information to be used for controlling the OIS driver 170.

In particular, the hall sensors 180 maybe separated from each other with the first coil 172 and the first magnet 171 interposed therebetween, and may block an influence from a change in an electromagnetic field due to a current flowing through the first coil 172.

As described above, the first terminal 177 from the first FPCB 175 and the second terminal 187 of the second FPCB 185 are arranged adjacent to third terminals 197-1 to 197-4 of wire springs 190-1 to 190-4 to be described below to be connected with the outside like terminals formed on one substrate. This may provide a very useful convenience in a process of connecting the camera module 100 with an external circuit or a substrate.

Referring to FIG. 2, the AF drivers 160 may be located on opposite sides thereof in response to the OIS drivers 170 disposed at two edges thereof. In addition, the AF driver 160 is provided between the OIS body 140 and the lens carrier 130, and specifically, may include a second coil 162 mounted on the inner surface of the central space of the OIS body 140 and a second magnet 161 mounted on the side of the lens carrier 130 in response to the second coil 162.

Specifically, the AF driver 160 may further include a hall sensor, a yoke, and the like, and further include second ball bearings that move along a guide rail perpendicular to both sides of the second coil 162 and the second magnet 161.

As illustrated in the drawings, the lens carrier 130 may also be provided with a thickness substantially similar to that of the OIS body 140, and the central space of the OIS body 140 may also be formed within the thickness of the OIS body 140 without a vertically extending structure. Thanks to the above-described structures, the OIS body 140 and the lens carrier 130 may be formed to be slim as in the embodiment.

In order to provide a horizontal restoring force of the OIS body 140, a plurality of wire springs 190-1 to 190-4 may be physically separated and provided between the OIS body 140 and the base 120. In the embodiment, the wire springs 190-1 to 190-4 are physically separated, but act on one OIS body 140 to move the OIS body 140 to its original position or provide a predetermined restoring force to horizontal movement of the OIS body 140.

In addition, each of the wire springs 190-1 to 190-4 may function as a transmission medium for transmitting a current or an electrical signal to the AF driver 160 mounted on the moving OIS body 140. To this end, one end of each of the wire springs 190-1 to 190-4 may be connected with the AF driver 160 in circuit, and the other end is exposed to the periphery of the base 120 like other terminals to form third terminals 197-1 to 197-4.

Based on one wire spring 190-1 among the four wire springs, the wire spring 190-1 may include a first fixing piece 191-1 fixed to a bottom surface of the OIS body 140 in response to one end, a first wave 192-1 extending from the first fixing piece 191-1, a second fixing piece 194-1 fixed to the base 120 and the cover 110 in response to the other end, and a second wave 193-1 extending from the second fixing piece 194-1 and vertically connected with the first wave 192-1. In addition, the third terminal 197-1 is bent downward from the second fixing piece 194-1, and may be in close contact with a mounting groove 126 for the third terminals 197-1 to 197-4 of the base 120. Another mounting groove 128 for the first end 176 may be further provided adjacent to the third terminals 197-1 to 197-4, and in the assembly process of FIG. 6, the first end 176 of the first FPCB 175 may be located on the last seating groove 128 together with the cover 110.

Referring to FIGS. 6 and 7, a protrusion 146 connected with the first fixing pieces 191-1 to 191-4 may be formed on the bottom surface of the OIS body 140, and the first fixing pieces 191-1 to 191-4 of the wire springs 190-1 to 190-4 may be physically fixed through the protrusion 146 of the OIS body 140.

In addition, the second fixing pieces 194-1 to 194-4 located on the opposite side of the wire springs 190-1 to 190-4 are supported on a stepper 122 of the base 120, and may be formed in an approximately L-lettered or L-lettered shape to be fixed over two sides of the base 120. In addition, a plurality of protrusions 116 and 117 corresponding to the second fixing pieces 194-1 to 194-4 may be formed on the cover 110, and these protrusions 116 and 117 of the cover 110 may pass through and be fixed to holes formed in both sides of the second fixing pieces 194-1 to 194-4 so that the other end of the springs 190-1 to 190-4 may be physically fixed between the cover 110 and the base 120.

The AF driver 160 may further include a third FPCB ( ) electrically connected with the second coil 162, and the wire springs 190-1 to 190-4 are formed to extend and be bent from the first fixing pieces 191-1 to 191-4, and may include a fourth terminal 198 electrically connected with the third FPCB ( ).

As described above, the present invention has been described with reference to the preferred embodiments thereof, but it will be appreciated by those skilled in the art that various modifications and changes of the present invention can be made without departing from the spirit and the scope of the present invention which are defined in the appended claims.

What is claimed is:

1. A camera module which comprises a cover, a base connected with the cover, and a lens carrier provided between the cover and the base, the camera module comprising:
   an OIS body provided inside the cover;
   a first ball bearing interposed between the cover and the OIS body;
   an AF driver provided between the OIS body and the lens carrier; and
   an OIS driver for moving the OIS body in perpendicular to an optical axis of the lens carrier,
   wherein the first ball bearing is in direct contact with an inner ceiling of the cover and an upper surface of the OIS body, and
   wherein a pocket portion for accommodating the first ball bearing is formed on the inner ceiling of the cover, and the upper surface of the OIS body corresponding to the pocket portion is provided as a flat surface.

2. The camera module of claim 1, wherein the OIS body is pulled to the inner ceiling of the cover to be in close contact with the inner ceiling of the cover.

3. The camera module of claim 1, wherein the OIS driver is provided between the cover and the OIS body.

4. The camera module of claim 3, wherein the OIS driver includes a first magnet mounted on the upper surface of the OIS body, a first coil mounted on the inner ceiling of the cover, the first coil facing the first magnet, and a first yoke interposed between the first coil and the cover,
   wherein an electric current flows through a wire wound around the first coil to induce an electromagnetic field that interacts with a magnetic field produced by the first magnet, the first coil moves the OIS body in a direction perpendicular to the optical axis of the lens carrier by interacting with the first magnet, and the first yoke allows the OIS body to be in close contact with the cover by interacting with the first magnet.

5. The camera module of claim 4, wherein the OIS driver includes a first flexible printed circuit board (FPCB) provided between the first coil and the cover, wherein the first FPCB is electrically connected with the first coil, a first end of the first FPCB extends downward along the inner surface of the cover to be exposed around the base, and a first terminal is formed at the first end of the first FPCB.

6. The camera module of claim 3, wherein the OIS driver includes a first magnet mounted on the inner ceiling of the cover, a first coil mounted on the upper surface of the OIS body, the first coil facing the first magnet, and a first yoke interposed between the first coil and the OIS body,
   wherein an electric current flows through a wire wound around the first coil to induce an electromagnetic field that interacts with a magnetic field produced by the first magnet, the first coil moves the OIS body in a direction perpendicular to the optical axis of the lens carrier by interacting with the first magnet, and the first yoke allows the OIS body to be in close contact with the cover by interacting with the first magnet.

7. The camera module of claim 1, further comprising:
a second FPCB provided on the base and provided with a second end exposed to periphery of the base, and a position detection sensor of the OIS body formed on the upper surface of the second FPCB,
wherein a second terminal is formed at the second end of the second FPCB.

8. A camera module which comprises a cover, a base connected with the cover, and a lens carrier provided between the cover and the base, the camera module comprising:
an OIS body provided inside the cover;
a first ball bearing interposed between the cover and the OIS body;
an AF driver provided between the OIS body and the lens carrier; and
an OIS driver for moving the OIS body in perpendicular to an optical axis of the lens carrier,
wherein the AF driver includes a second coil mounted on an inner surface of a central space of the OIS body, and a second magnet mounted on a side surface of the lens carrier, the second magnet facing the second coil, and
wherein the central space of the OIS body is formed within a thickness of the OIS body without vertical extension.

9. The camera module of claim 8, further comprising:
a plurality of wire springs provided between the OIS body and the base to provide a horizontal restoring force of the OIS body,
wherein each of the wire springs is electrically separated, but one end thereof is connected with a circuit of the AF driver, and the other end thereof is exposed to the periphery of the base to form a third terminal, and
the one end of the wire spring is physically fixed to the OIS body, and the other end of the wire spring is physically fixed to the base or the cover.

10. The camera module of claim 9, wherein the wire spring includes a first fixing piece fixed to a bottom surface of the OIS body in response to at the one end, a first wave extending from the first fixing piece, a second fixing piece fixed to the base or the cover at the other end, and a second wave extending from the second fixing piece and intersecting with and connected with the first wave, and the third terminal is formed to be bent from the second fixing piece.

11. The camera module of claim 10, wherein the AF driver further comprises a third FPCB constituting a part of the circuit of the AF driver and electrically connected with the second coil, and
the wire spring includes a fourth terminal extending and bent from the first fixing piece and electrically connected with the third FPCB.

12. The camera module of claim 10, wherein the second fixing piece is formed in an L-shape and fixed over two sides of the base.

13. A camera module comprising:
a base;
a cover connected with the base;
an OIS body provided inside the cover and the base;
a lens carrier provided in a central space of the OIS body and moving in an optical axis direction;
a first ball bearing interposed between an inner ceiling of the cover and an upper surface of the OIS body;
an AF driver provided between the OIS body and the lens carrier; and
an OIS driver for moving the OIS body in perpendicular to an optical axis of the lens carrier,
wherein the OIS driver includes a first magnet mounted on the upper surface of the OIS body, a first coil mounted on the inner ceiling of the cover, the first coil facing the first magnet, and a first yoke interposed between the first coil and the cover,
wherein an electric current flows through a wire wound around the first coil to induce an electromagnetic field that interacts with a magnetic field produced by the first magnet, the first coil moves the OIS body in a direction perpendicular to the optical axis of the lens carrier by interacting with the first magnet, and the first yoke allows the OIS body to be in close contact with the cover by interacting with the first magnet,
wherein the first ball bearing is in direct contact with an inner ceiling of the cover and an upper surface of the OIS body, and
wherein a pocket portion for accommodating the first ball bearing is formed on the inner ceiling of the cover, and the upper surface of the OIS body corresponding to the pocket portion is provided as a flat surface.

14. The camera module of claim 13, wherein the OIS driver includes a first FPCB (FPCB) provided between the first coil and the cover, wherein the first FPCB is electrically connected with the first coil, a first end of the first FPCB extends downward along the inner surface of the cover to be exposed around the base, and a first terminal is formed at the first end of the first FPCB.

15. The camera module of claim 13, further comprising:
a second FPCB provided on the base and provided with a second end exposed to the periphery of the base, and a hall sensor formed on the upper surface of the second FPCB,
wherein a second terminal is formed at the second end of the second FPCB, and
the hall sensor is located below the first magnet to detect the position of the OIS body by using the movement of the first magnet.

16. The camera module of claim 13, wherein the AF driver includes a second coil mounted on an inner surface of the central space of the OIS body and a second magnet mounted on a side surface of the lens carrier, the second magnet facing the second coil, wherein the central space of the OIS body is formed within a thickness of the OIS body without vertical extension.

* * * * *